May 2, 1967 W. D. LEWIS 3,316,895
DEVICE FOR COLLECTING SEMEN
Filed June 21, 1965
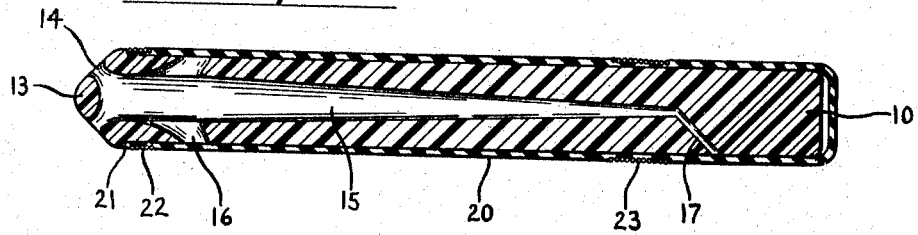
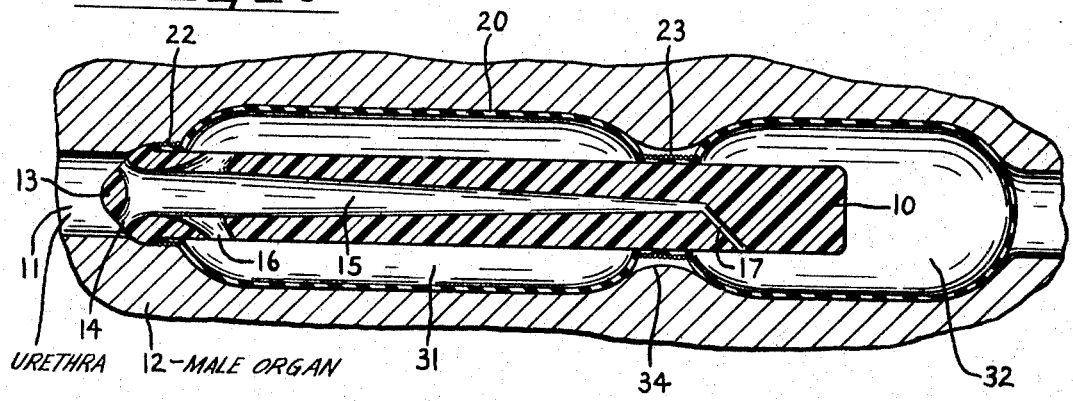
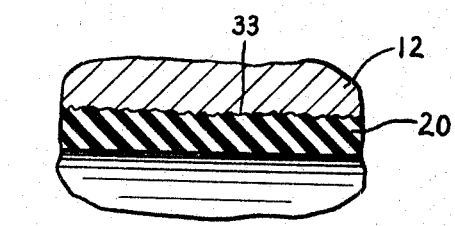
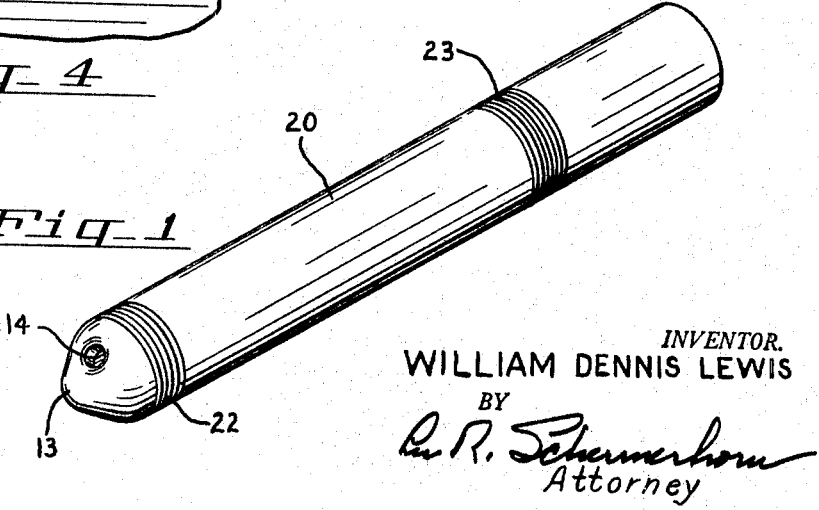
INVENTOR.
WILLIAM DENNIS LEWIS
BY
*R. R. Schermerhorn*
Attorney

United States Patent Office

3,316,895
Patented May 2, 1967

3,316,895
DEVICE FOR COLLECTING SEMEN
William Dennis Lewis, 1955 SE. 23rd Ave., Portland, Oreg. 97214; Dorothy D. Lewis, executrix of said William D. Lewis, deceased, assignor to Dorothy Dale Lewis, Portland, Oreg.
Filed June 21, 1965, Ser. No. 465,419
2 Claims. (Cl. 128—2)

This invention relates to a device for collecting male semen from humans or animals for laboratory analysis and other purposes.

Objects of the invention are to provide an improved device for collecting male semen, to provide a device which does not inhibit or destroy the spermatozoa as well as other forms of microscopic life that are responsible for venereal and other infectious diseases, to provide a device of the type described which will keep the semen at body temperature until it is to be used, to provide a device for collecting semen for artificial insemination and to provide a device of the type described which is simple and inexpensive to manufacture and easy to use.

The present device comprises a cylindrical receptacle of a size to be admitted into the male urethra. It is equipped with an elastic covering which is distendable upon discharge of semen to expand and contain the semen and provide retention of the device in the urethra. After discharge of semen into the device, it is left in the urethra to keep the semen at body temperature until the specimen is to be used.

The invention will be better understood and additional objects and advantages will become apparent from the following description of the preferred embodiment illustrated on the accompanying drawing. Various changes may be made, however, in the details of construction and arrangement of parts and certain features may be used without others. All such modifications within the scope of the appended claims are included in the invention.

In the drawing:

FIGURE 1 is an enlarged perspective view of a device embodying the features of the invention;

FIGURE 2 is a longitudinal sectional view;

FIGURE 3 is a longitudinal sectional view, showing the device in a urethra with the sleeve in distended position; and FIGURE 4 is an enlarged view of a portion of FIGURE 3.

Referring first to FIGURES 2 and 3, the numeral 10 designates a core, preferably made of a pliable plastic material having a cylindrical outer surface of appropriate diameter to fit into the urethra 11 of a male organ 12. The proximal end 13 is rounded for convenient insertion and provided with a plurality of inlet openings 14 spaced between the axis and circumference of the core 10. These openings communicate with the large proximal end of a tapered lumen 15 which extends to a point near the distal end. Near the proximal end of the core 10, a plurality of passages 16 curve forward and outward from the lumen 15 to the exterior surface of core 10. At the distal end of the lumen there are one or more similar passages 17 which extend angularly forward and outward to the wall of the core.

The core 10 including its distal end is enclosed in a thin elastic rubber or plastic sleeve 20. This sleeve is normally slightly stretched to hug the outer cylindrical wall of core 10 smoothly without wrinkles or looseness. In order to provide uniform external diameter, the core 10 has a shoulder 21 near its proximal end and is slightly reduced in diameter from this shoulder to its distal end, the reduction in radius being equal to or slightly greater than the thickness of the sleeve 20. Immediately behind shoulder 21 the proximal end of sleeve 20 is secured to the reduced portion of core 10 by suitable means such as a winding 22 which is positioned in a proximal direction from the passages 16. Near the distal end of the sleeve, a similar winding 23 or other suitable means secures the sleeve to the outer surface of core 10 at a distance to the rear of passage 17.

The two points of securement 22 and 23 provides two vesicles or bladders 31 and 32 to contain the semen and provide retention of the device in the urethra. For the purpose of enhancing the retention, the outer surface of the sleeve may be made rough, if desired, as indicated at 33. A suitable lubricant may be applied to this roughened surface to facilitate insertion in the urethra.

When emission occurs, semen enters the openings 14 and flows into lumen 15 and out of passages 16 to distend the bladder 31. Such enlargement of the bladder stretches the urethra to some extent as shown in FIGURE 3 to provide retention for the device in the urethra. Semen also flows out of lumen 15 through passage 17, causing distention of bladder 32 both radially and longitudinally away from the distal end of core 10 as shown. Such enlargement of bladder 32 provides additional retention in the urethra so that the device will not be expelled from the urethra accidentally. An undistended portion 34 of the urethra between the two bladders 31 and 32 tends to prevent longitudinal movement of the device. It is readily removable, however, by a doctor's instrument. The two bladders plus lumen 15 provide sufficient capacity to contain the discharge.

The semen is thereby kept at body temperature until the device is removed by a doctor or veterinarian. The rubber or plastic materials of the parts 10 and 20 are of an inert nature and without the chemicals ordinarily used in prophylactic devices to inhibit or destroy the spermatozoa or other forms of microscopic life which are desired to be retained in the present device. The semen thus obtained can be used for laboratory analysis or can be prepared for freezing and storage for artificial insemination when desired. The sleeve 20 being very thin has relatively weak elastic properties so that the bladders 31 and 32 tend to remain distended when the device is removed from the urethra, without immediately ejecting the semen from openings 14 before it can be transferred to a suitable receptacle.

Having now described my invention and in what manner the same may be used, what I claim as new and desire to protect by Letters Patent is:

1. A device for collecting semen comprising a hollow cylindrical core having a diameter to fit in a male urethra, an elastic sleeve fitting the distal end of said core and a major portion of its side wall, means securing the proximal end of said sleeve to said side wall near the proximal end of said core, and means securing an intermediate portion of said sleeve circumferentially to said side wall to form proximal and distal bladders in said sleeve, the proximal end of said core having an inlet opening, and said core having outlet openings into both of said bladders, said sleeve being distendable away from said core to receive fluid from said outlet openings.

2. A device for collecting semen comprising a cylindrical core having a diameter to fit in a male urethra, a rounded proximal end of said core having inlet openings, a tapered longitudinal lumen in said core having a large end communicating with said inlet openings and a small end near the distal end of the core, a closed end elastic sleeve fitting the distal end and a major portion of the side wall of said core, means securing the proximal end of said sleeve circumferentially to said side wall near the proximal end of said core, means securing an intermediate portion of said sleeve circumferentially to said side wall to form proximal and distal bladders in said sleeve, passageways from the large end of said lumen to said proximal bladder, and a passageway from the small end of said lumen to said distal bladder, said sleeve being distendable away from said core to receive fluid from said passageways.

References Cited by the Examiner
UNITED STATES PATENTS

| | | | |
|---|---|---|---|
| 2,433,538 | 12/1947 | Warner | 128—294 |
| 2,544,200 | 3/1951 | Wade | 128—275 |
| 2,564,773 | 8/1951 | Wade | 128—275 |
| 2,686,519 | 8/1954 | Westerman | 128—294 |

FOREIGN PATENTS 504,554   8/1960   Germany.

RICHARD A. GAUDET, *Primary Examiner.*

S. BRODER, *Assistant Examiner.*